Figure 1:
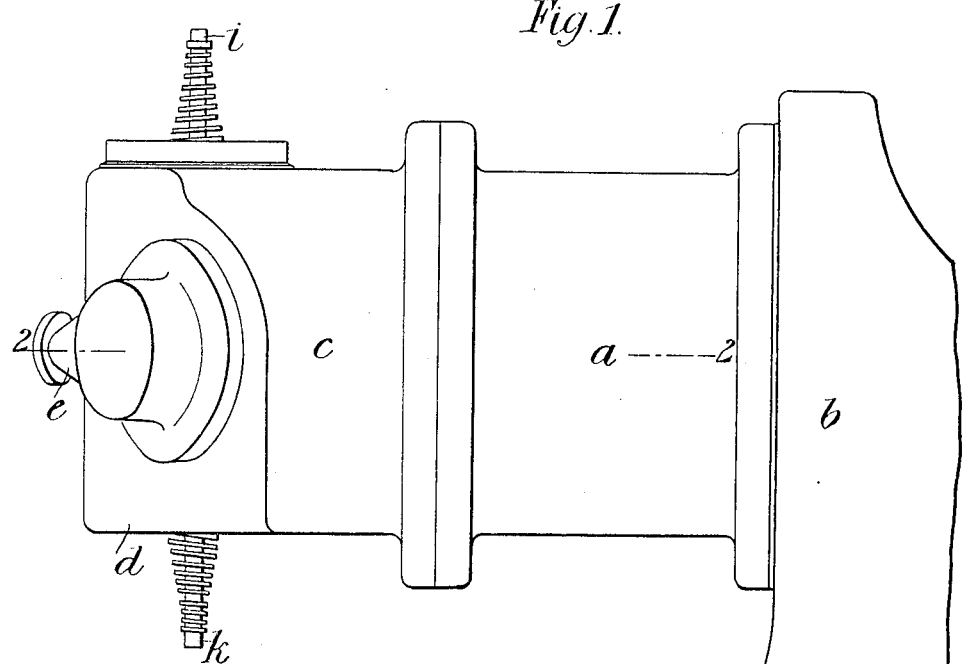

D. ROBERTS.
INTERNAL COMBUSTION ENGINE.
APPLICATION FILED NOV. 9, 1907.

904,086.

Patented Nov. 17, 1908.

2 SHEETS—SHEET 1.

Witnesses:

Inventor:
David Roberts

UNITED STATES PATENT OFFICE.

DAVID ROBERTS, OF GRANTHAM, ENGLAND.

INTERNAL-COMBUSTION ENGINE.

No. 904,086.　　　　Specification of Letters Patent.　　　Patented Nov. 17, 1908.

Application filed November 9, 1907. Serial No. 401,488.

*To all whom it may concern:*

Be it known that I, DAVID ROBERTS, a subject of the King of Great Britain, residing at Spittlegate Iron Works, Grantham, county of Lincoln, England, have invented new and useful Improvements in Internal-Combustion Engines, of which the following is a specification.

My invention relates to internal combustion engines using hydrocarbon as fuel and to that type of engine wherein the vaporizer or combustion chamber is formed as an extension of the cylinder, the said vaporizer being connected to the cylinder by a more or less contracted neck or passage and also in some cases being partly water jacketed.

In engines of this type the air inlet and exhaust outlet valves have in some cases been arranged in one valve box with a passage common to the two valves opening directly into the cylinder proper; in other cases the two valves have been arranged in separate valve boxes, each having its own passage opening directly into the cylinder proper, and in still further cases they have been arranged with the air inlet valve opening directly into the vaporizer or combustion chamber and the exhaust outlet valve in a separate valve box with a passage opening directly into the cylinder proper. With all the above arrangements the degree of compression and consequently the power obtained from a cylinder of given size and the efficiency of the engine have been limited, owing to the air contained in the above named clearance spaces and various passages and valve boxes outside the vaporizer or combustion chamber being more or less inert.

My invention has for its object to enable engines having vaporizers or combustion chambers of the above named types to work with higher compression than hitherto by reducing the clearance spaces in the cylinders and passages leading to the air inlet and exhaust outlet valves and boxes to a minimum and introducing a greater proportion of air than heretofore into the vaporizer or combustion chamber whereby better combustion, greater efficiency, and more power are obtained from a given size cylinder than hitherto.

In carrying out my invention I form a passage on one side of the vaporizer or combustion chamber that is to say on the cold or water jacketed part thereof where such a construction is employed, and in this passage I arrange the air inlet and exhaust outlet and their valves, the said valves being directly opposite one another and each opening inwards and being operated by any suitable means. With this arrangement the passage leading from the air inlet and exhaust outlet valves to the vaporizer is of minimum capacity and this passage and a portion of the vaporizer or combustion chamber into which the passage leads are scavenged by the air entering on each induction stroke.

In order that my invention may be fully understood I will describe it with reference to the accompanying drawing, in which:—

Figure 2:
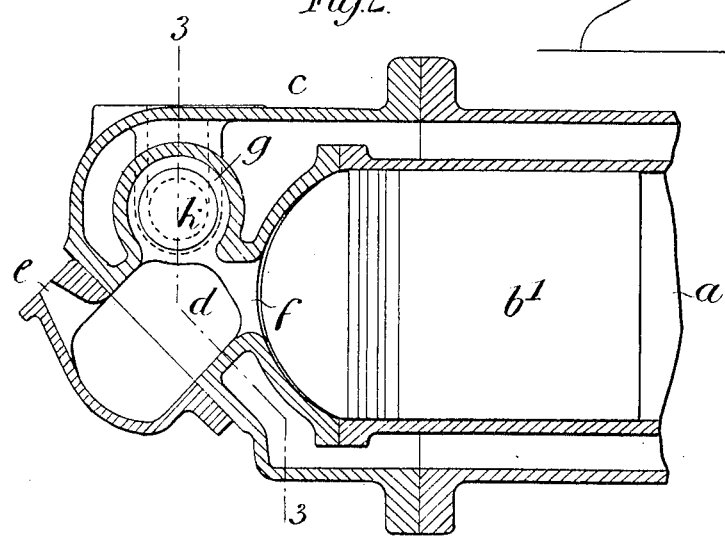
Figure 3:
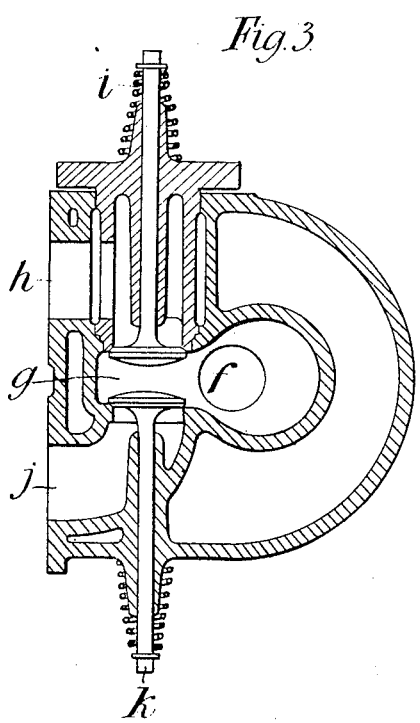

Figure 1 is a side elevation of the cylinder and vaporizer of a horizontal engine having my improvements applied thereto. Fig. 2 is a horizontal section on the line 2—2, Fig. 1 and Fig. 3 is a sectional end elevation on the line 3—3, Fig. 2.

*a* is the water jacketed cylinder mounted on the frame *b* and *b'* is the piston.

*c* is the vaporizer having a water jacketed portion *d* and an oil inlet *e* and connected to the cylinder by the contracted passage *f*, the axis of the vaporizer being arranged at an angle with the axis of the cylinder in order to obtain the minimum clearance.

*g* is the passage formed in the side of the cold or water jacketed part *d* of the vaporizer, in which passage the air inlet *h* and the valve *i*, and the exhaust outlet *j* and valve *k* are arranged directly opposite one another, the valves *i* and *k* opening inwards.

With the above described construction the capacity of the passage *g* is materially reduced and the said passage and the portion of the vaporizer into which it leads are scavenged of inert or exhaust gases by the air entering on each induction stroke of the piston.

Although the passage *g* is shown on the side of the engine, with the inlet and exhaust valves vertical, the said passage and valves and the inclined axis of the vaporizer may be arranged at any other angle to the horizontal plane, and, furthermore, although the invention is shown as applied to a horizontal engine it can obviously be adapted to other types of engines.

Having now fully described and ascer- tained my said invention and the manner in which it is to be performed, I declare that what I claim is:—

1. In an internal combustion engine, the combination with the cylinder, and piston, of a vaporizing chamber communicating directly with the cylinder by a passage of less diameter than the cylinder, a fuel inlet connected with the vaporizing chamber, a passage at one side of the vaporizing chamber, in direct and open communication therewith, air inlet and exhaust passages communicating with the said passage, and controlling valves interposed between said passage and said inlet and exhaust passages, substantially as described.

2. In an internal combustion engine, the combination with the cylinder and piston, of a vaporizing chamber, communicating directly with the cylinder by an aperture of less diameter than the cylinder, a fuel inlet communicating with said chamber, a passage located at one side of said chamber in direct and open communication therewith, an air inlet passage and an exhaust passage communicating with said passage, valves interposed between said passage and the air inlet and exhaust passages, and a water jacket substantially surrounding said passage, the portion of the chamber adjacent to the fuel inlet being unprovided with a water jacket, substantially as described.

3. In an internal combustion engine, the combination with a cylinder and piston, of a vaporizing chamber located adjacent to the head of the cylinder and at one side of the center thereof, and communicating with the cylinder by an aperture disposed centrally with respect to the cylinder head, and of less diameter than the cylinder said vaporizing chamber being provided with a fuel inlet, a passage, located adjacent to the vaporizing chamber, and on the opposite side of the center of the cylinder, and communicating with the said chamber, air inlet and exhaust passages communicating with said passage at directly opposite points, valves in said passage controlling said air inlet and exhaust passages, and a water jacket substantially surrounding the said passage, the portion of the vaporizing chamber adjacent to the fuel inlet being unprovided with a water jacket, substantially as described.

DAVID ROBERTS.

Witnesses:
W. HAYNES,
W. PAYNE.